(12) United States Patent
Haywood

(10) Patent No.: US 6,941,426 B2
(45) Date of Patent: Sep. 6, 2005

(54) SYSTEM FOR HEAD AND TAIL CACHING

(75) Inventor: Chris Haywood, Thousand Oaks, CA (US)

(73) Assignee: Internet Machines Corp., Agoura Hills, CA (US)

( * ) Notice: Subject to any disclaimer, the term of this patent is extended or adjusted under 35 U.S.C. 154(b) by 103 days.

(21) Appl. No.: 10/039,953

(22) Filed: Dec. 31, 2001

(65) Prior Publication Data

US 2003/0037210 A1 Feb. 20, 2003

Related U.S. Application Data

(63) Continuation-in-part of application No. 09/930,804, filed on Aug. 15, 2001.

(51) Int. Cl.$^7$ ................................................ G06F 12/00
(52) U.S. Cl. ........................ 711/154; 711/171; 711/172; 710/52; 710/53; 710/54; 710/57; 710/65; 710/66; 710/33; 710/34; 710/35
(58) Field of Search ......................... 711/154, 170–172, 711/211, 212, 118; 710/33–35, 52–54, 65–66, 57, 55, 56; 370/236

(56) References Cited

U.S. PATENT DOCUMENTS

| | | | | |
|---|---|---|---|---|
| 4,958,299 A | * | 9/1990 | Akada | 358/1.3 |
| 5,606,370 A | * | 2/1997 | Moon | 375/240.23 |
| 5,659,713 A | * | 8/1997 | Goodwin et al. | 711/157 |
| 5,845,145 A | * | 12/1998 | James et al. | 710/1 |
| 5,905,911 A | * | 5/1999 | Shimizu | 710/22 |
| 6,172,927 B1 | * | 1/2001 | Taylor | 365/219 |
| 6,292,878 B1 | * | 9/2001 | Morioka et al. | 711/209 |
| 6,389,489 B1 | * | 5/2002 | Stone et al. | 710/57 |
| 6,510,138 B1 | * | 1/2003 | Pannell | 370/236 |
| 6,557,053 B1 | * | 4/2003 | Bass et al. | 710/29 |
| 6,658,503 B1 | * | 12/2003 | Agarwala et al. | 710/35 |
| 6,687,768 B2 | * | 2/2004 | Horikomi et al. | 710/30 |
| 6,754,741 B2 | * | 6/2004 | Alexander et al. | 710/52 |

* cited by examiner

Primary Examiner—Matthew D. Anderson
Assistant Examiner—Zhuo H. Li
(74) Attorney, Agent, or Firm—SoCal IP Law Group LLP; Steven C. Sereboff

(57) ABSTRACT

A head and tail caching system. The system includes a tail FIFO memory having a tail input to receive incoming data. A memory is included that is operable to store data that is output from the tail FIFO and output the stored data at a memory output. A multiplexer is included having first and second multiplexer inputs coupled to the tail FIFO and the memory, respectively. The multiplexer has a control input to select one of the multiplexer inputs to coupled to a multiplexer output. A head FIFO memory receives data from the multiplexer output, and outputs the data on an output data path. A controller is operable to transfer one or more blocks data having a selected block size from the tail FIFO to the memory and from the memory to the head FIFO, to achieve a selected efficiency level.

15 Claims, 8 Drawing Sheets

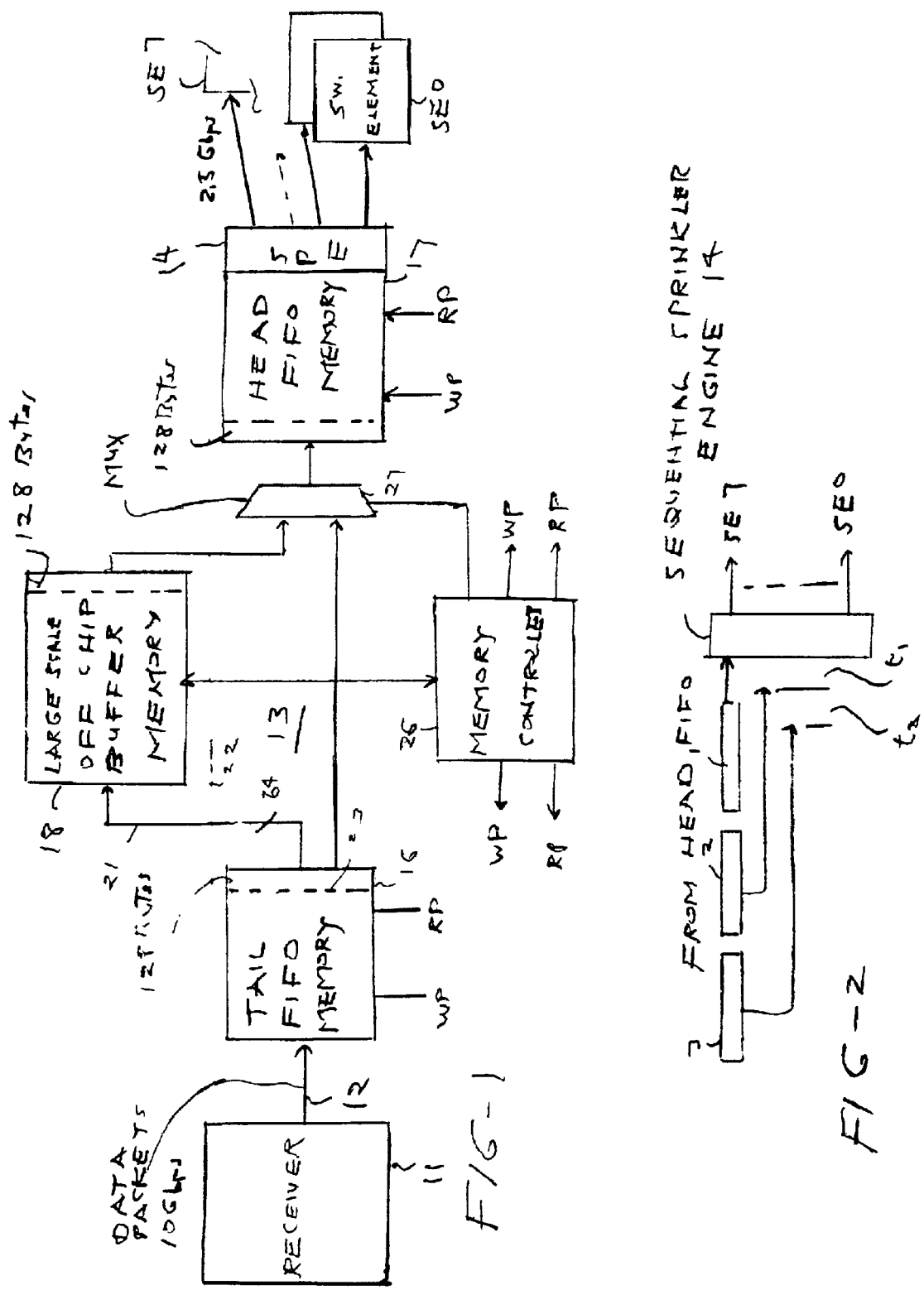

SYSTEM FOR HEAD AND TAIL CACHING

CROSS REFERENCE TO RELATED APPLICATIONS

The present invention is a continuation-in-part (CIP) of a co-pending U.S. Patent Application entitled "VARIABLE SIZE FIRST IN FIRST OUT (FIFO) MEMORY WITH HEAD AND TAIL CACHING" filed on Aug. 15, 2001 and having application Ser. No. 09/930,804.

FIELD OF THE INVENTION

The present invention is structured to a variable size First In First Out (FIFO) memory with head and tail caching.

BACKGROUND OF THE INVENTION

Communications networks now require handling of data at very high serial data rates. For example, 10 gigabits per second (Gbps) is common. When it is required to process at these speeds, high-speed data parallel connections are used to increase the effective bandwidth. This may be unsatisfactory because of the resultant decrease in bandwidth due to increased overhead requirements. There is a need for effective high speed switching apparatus and the associated hardware to support such a apparatus.

OBJECT AND SUMMARY OF INVENTION

It is therefore an object of the present invention to provide a variable size First In First Out (FIFO) memory.

In accordance with the above object, there is provided a variable size first in first out (FIFO) memory comprising a head FIFO memory for sequentially delivering data packets at a relatively slow rate to a plurality of switching elements whereby some latency occurs between data packets. A tail FIFO memory stores an overflow of the data packets from the head memory. Both the head and tail memories operate at a relatively high data rate equivalent to the data rate of incoming data packets. A large capacity buffer memory is provided having an effectively lower clock rate than the FIFO memories for temporarily storing data overflow from the tail memory whereby the FIFO memories in combination with the buffer memory form a variable size FIFO memory.

In one embodiment included in the present invention, a caching system is provided that includes a tail FIFO memory having a tail input to receive incoming data and a tail output to output the incoming data. A memory is included having a memory input and a memory output, the memory input is coupled to the tail output and the memory is operable to store the incoming data that is output from the tail output. The memory is operable to output the stored data at the memory output. A multiplexer is included having first and second multiplexer inputs coupled to the tail output and the memory output, respectively, the multiplexer having a control input to select one of the multiplexer inputs to coupled to a multiplexer output. A head FIFO memory is included having a head input to receive the incoming data that is coupled to the multiplexer output, and a head output to output the incoming data. Lastly, a controller is included that is coupled to the tail FIFO, the head FIFO, and the memory and operable to transfer one or more blocks of the incoming data having a selected block size from the tail FIFO to the memory and from the memory to the head FIFO, wherein the selected block size provides a selected memory transfer efficiency level.

In another embodiment included in the present invention, a method for implementing a caching system is provided. The method includes the steps of receiving data at a tail FIFO memory, selecting an efficiency level for operating a memory interface, determining a selected block size to support the efficiency level, transferring data from the tail FIFO memory to a head FIFO memory when the head FIFO is within a first fill level, wherein the head FIFO memory includes an output to output the data, transferring one or more blocks of the data having the selected block size, from the tail FIFO to a memory via the memory interface, when the head FIFO is within a second fill level, and transferring the one or more blocks of data from the memory to the head FIFO when the head FIFO is within a third fill level.

BRIEF DESCRIPTION OF DRAWINGS

The foregoing aspects and the attendant advantages of this invention will become more readily apparent by reference to the following detailed description when taken in conjunction with the accompanying drawings wherein:

FIG. 1 is a block diagram of a memory provided in one embodiment of the present invention;

FIG. 2 is a diagrammatic portion of FIG. 1 illustrating its operation;

DETAILED DESCRIPTION OF PREFERRED EMBODIMENT

Figure 3:
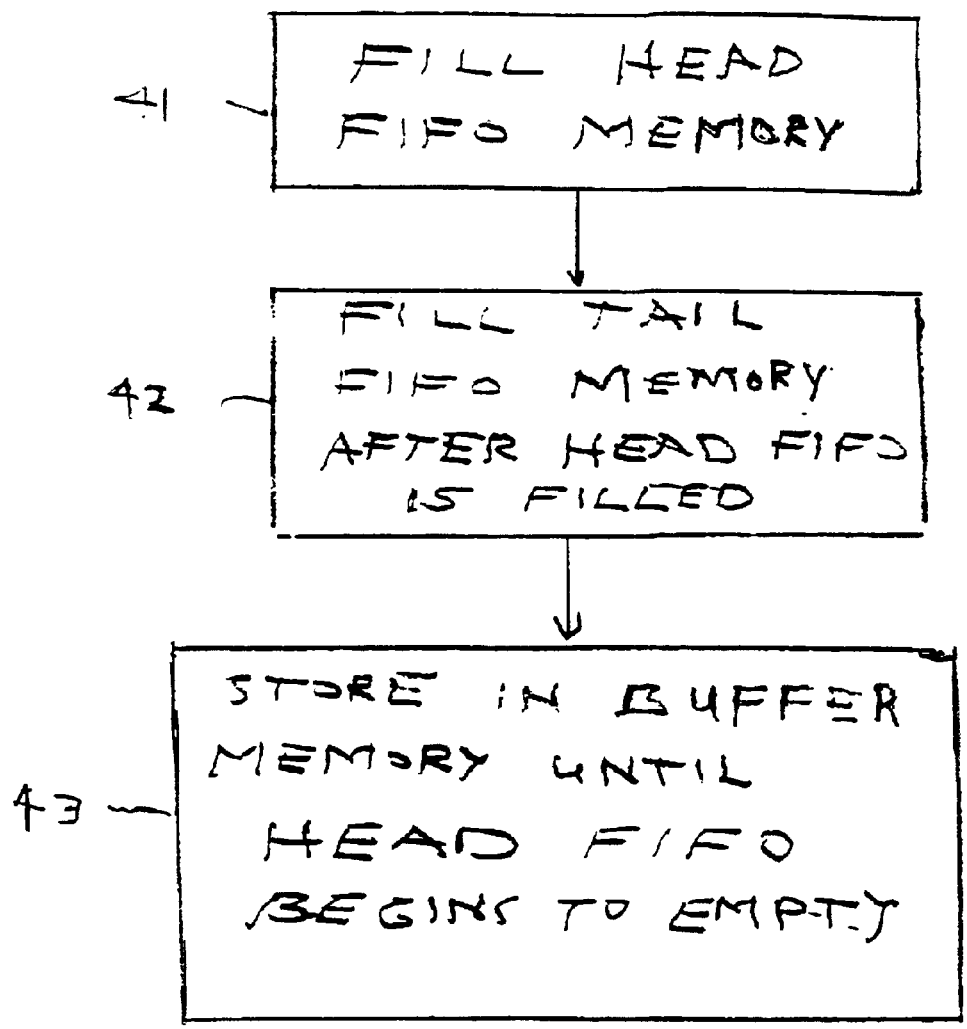
FIG. 3 is a flow chart of the operation of FIG. 1.

As disclosed in a co-pending application Ser. No. 09/962,056 entitled High Speed Channels Using Multiple Parallel Lower Speed Channels switching of input data arriving at a relatively high data rate of, for example 10 Gbps, may be accomplished. As illustrated in FIG. 1 a plurality of switching elements SE0–SE7 which operate at a much lower data rate, for example 2.5 Gbps. By the use of a sequential or successive sprinkling technique for complete data packets, a high data rate may be maintained, for example, by providing for load balancing. Data packets arrive from a receiver 11 which would have a communications processor coupled to it on line 12 at 10 Gbps and via the variable FIFO memory illustrated at 13, FIFO being First In First Out memory. Data packets are routed to a sequential sprinkler engine 14 and then distributed at the lower data rate to various switching elements. In general, a variable FIFO memory is required where a sudden burst of input data may occur which would temporarily overwhelm an individual FIFO memory without a large scale buffer memory (which it can be assumed has almost unlimited memory capacity since it is remote or off the same semiconductor chip as the high speed memory).

FIG. 2 illustrates where some latency may occur; in other words, there would not be a continuous serial transmission of the high-speed data packets through to the switch elements. Thus, the data packets 1, 2, 3 are indicated in a line of data being received. The first data packet is routed to the switching element 7. After this operation is started, a short time later as indicated by the time lapse $t_1$, data packet two is distributed by the sprinkler engine; and then data packet three at a later time $t_2$. Some latency occurs which must be compensated for by some type of buffer apparatus.

This is provided by the overall variable FIFO memory which is a combination of a tail FIFO memory 16, a head FIFO memory 17 and the large scale off chip buffer memory 18. Variable blocks of data are formed by a receiver 11 and transferred through the tail FIFO memory to the head FIFO memory 17 until it is filled. Thus, the tail or FIFO 16 routes data to the head FIFO memory 17 which then distributes data packets to the various switching elements. If the head FIFO memory becomes full, the tail FIFO memory will start filling. The tail FIFO will buffer enough data to keep the head FIFO filled. If the tail FIFO fills due to a sudden burst, data is then written on the line of 21 to the large scale off chip memory 18. This data will be read from the large scale memory into the head FIFO when the head FIFO starts to empty.

From a practical standpoint to operate at the data rate of 10 Gbps, tail FIFO 16 and head FIFO 17 are located on a common semiconductor substrate or chip with the large scale buffer memory 18 being remotely located off chip. This is indicated by the dash line 22. When the tail FIFO memory becomes full then the large scale off chip buffer memory 18 is utilized. Uniform blocks of data are stored indicated by the dash line 23. For example, 128 bytes is transferred on the line 21 into the memory 18. This memory also includes a similar block size of 128 bytes. For example, line 21 may have a 64 bit width (meaning eight bytes) and thus, the data block of 128 bytes is transferred in 16 clock cycles (16× 64=128 bytes). Optimization of the bus width in all of the FIFO and buffer memories provide, in effect, a 100 percent efficient transfer technique since for every clock cycle a maximum number of bits is transferred. However buffer memory 18 has a lower clock rate and therefore wider bus. In the present application this could be two read and two write cycles. The various write pointers and read pointers (WP and RP) are so indicated on the various memories and the overall control is accomplished by the memory controller 26. A multiplexer 27 connected to memory controller 26 provides for control of the various data routings. When a sudden burst of data packets ceases, the FIFO memory can then return to its ordinary mode of operation, wherein the head FIFO memory 17 contains all of the inputted data packets as delivered by the tail FIFO memory. Of course, this does not occur until the large scale off chip buffer memory 18 is unloaded.

The foregoing operation is shown in a flow chart of FIG. 3. In step 41 the head FIFO memory is filled, and in step 42, if the head FIFO overflows, the tail FIFO memory is filled. Then in step 43, again when the tail FIFO is filled, data is stored in the buffer memory until the head FIFO begins to empty. In general, memory controller 26 monitors the FIFO depth and determines if a block of data needs to be stored to off chip memory. It also keeps track of how many blocks are written. As the FIFO memories empty, the memory controller is responsible for arbitrating and retrieving any stored blocks of data. The larger external buffer memory 18 can be provisioned, using one of many allocation schemes, to support multiple head and tail FIFOs in the same manner as described. Thus, multiple variable FIFO memories with head and tail caching are provided.

Figure 4:
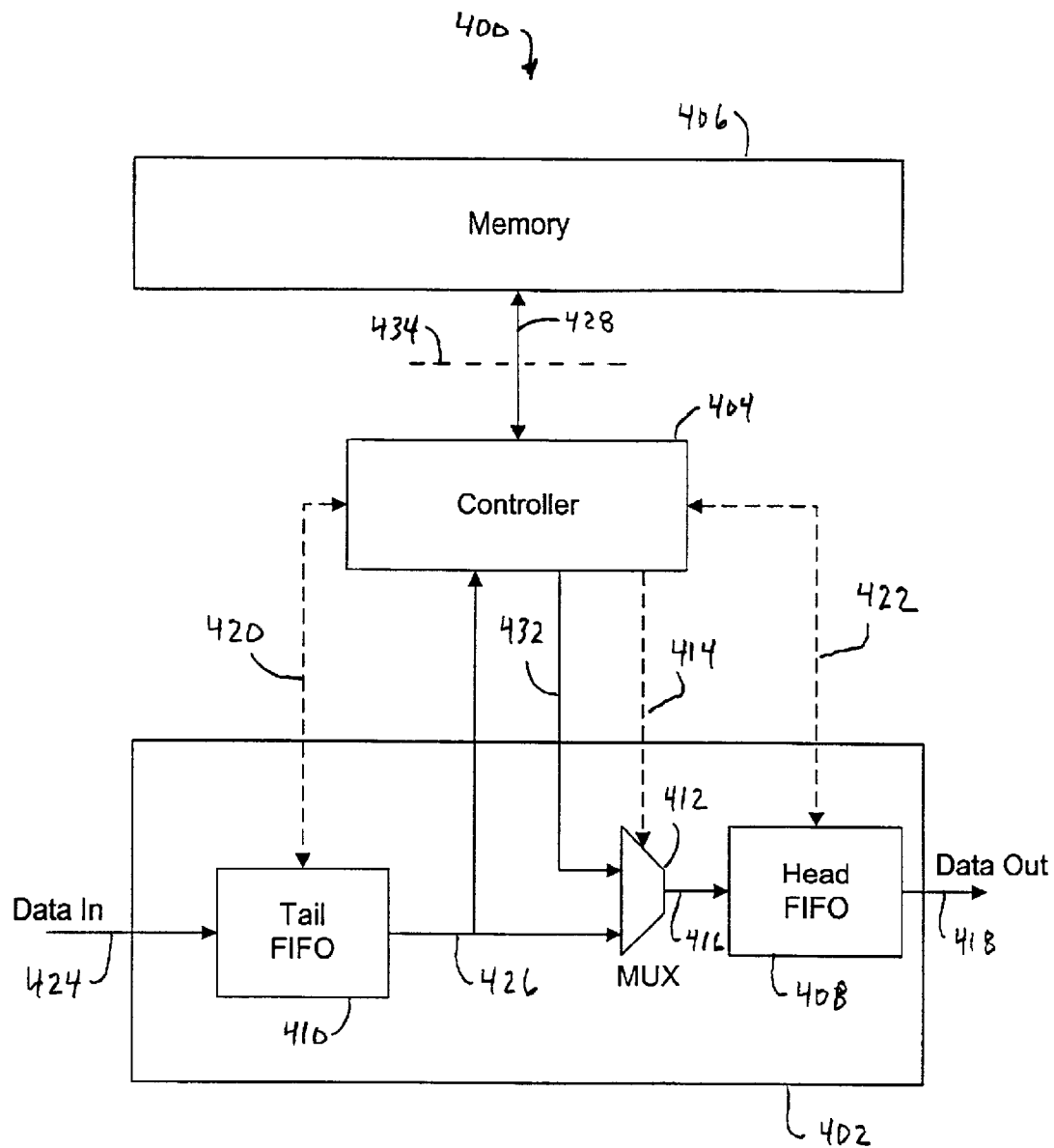
FIG. 4 shows one embodiment of a head and tail caching system constructed in accordance with the present invention.

FIG. 4 shows one embodiment of a head and tail caching system 400 constructed in accordance with the present invention. The system 400 includes a FIFO circuit 402, a controller 404, and a memory 406. The FIFO circuit 402 includes a tail FIFO memory 410, a head FIFO memory 408 and a multiplexer (mux) 412. In one embodiment, the tail and head FIFOs have 256 bytes of memory for data storage. However, the FIFOs may be of any size depending on the caching application. The mux 412 has two inputs that can each be selectively coupled to a mux output.

During operation of the system 400, a high-speed data stream is received at an input 424 to the tail FIFO. For example, the data stream may have a data rate of 10 Gbps or higher, and may include data frames with varying data lengths, for example, from a few bytes to thousands of bytes per frame. The received data is temporarily stored at the tail FIFO until it is transferred from an output 426 of the tail FIFO to a first input of the mux 412. The mux 412 includes a mux control input 414 that can be used to control the mux to couple the data received from the tail FIFO at the first mux input to a mux output 416 that is coupled to the head FIFO 408. The data is temporarily stored at the head FIFO until it is transferred from an output 418 of the head FIFO on a high-speed transmission path to another data receiving entity. For example, the caching system 400 may transmit data at the same rate the data is received. Thus, in one mode of operation, data received at the tail FIFO flows directly through the mux 412 to the head FIFO where it is output to other entities.

The controller 404 is coupled to a fill level indicator 420 of the tail FIFO and a fill level indicator 422 of the head FIFO. The fill level indicators allow the controller 404 to determine how much memory space is being used and how much memory space is available at the tail and head FIFOs. The controller 404 is also coupled to the tail FIFO output 426, so that the controller can receive data output from the tail FIFO 410.

The memory 406 is preferably a large buffer memory that provides more memory space than that provided by the tail and head FIFOs. However, the memory 406 may be of any desired size. The memory has a read/write interface 428 that is coupled to the controller 404. As a result, the controller is operable to receive data from the tail FIFO output 426 and write the data into the memory 406 via the interface 428. At some desirable time thereafter, the controller is able to read the data from the memory via the interface 428. In one embodiment, the interface comprises a 128-bit wide data path, however, the data path may be set to any desired width.

The controller 404 also includes an output 432 that is coupled to a second input of the mux 412 to allow the controller to output data to the mux. The controller also generates the mux control signal 414, so that the controller can control the operation of the mux to couple either of the mux inputs to the mux output 416. Thus, in one mode of operation, the controller receives data from the tail FIFO, stores that data into the memory 406, and at some time later, retrieves the data from the memory and outputs that data to the second input of the mux. Furthermore, the controller controls the mux operation, via the mux control 414, to couple the second mux input to the mux output, so that the data flows to the head FIFO, where it is ultimately output at output 418.

Based on the specific application, the system 400 can be configured to include various data path sizes to transfer data from the input to the output to facilitate the caching function. For example, the data input 424 may be a serial or parallel bit stream at a very high data rate (i.e., 10 Gbps). The tail FIFO may operate on the data in the same format as received or may convert the data into a parallel format (i.e., 8-bit byte format) having a byte rate that is less than the input serial data rate. The tail FIFO may output the wider but reduced rate data to the controller, which in turn, may further format the byte data into words having a lower word rate for storage in the memory 406. For example, the write and read data paths to the memory may be 64-bit wide paths, so that the memory 406 may operate at a much slower speed than the FIFOs (410, 408). Thus, it is possible to configure the data paths and the operation of various components to adjust to the transmission rate of the data so that faster or slower components may be utilized.

Figure 5:
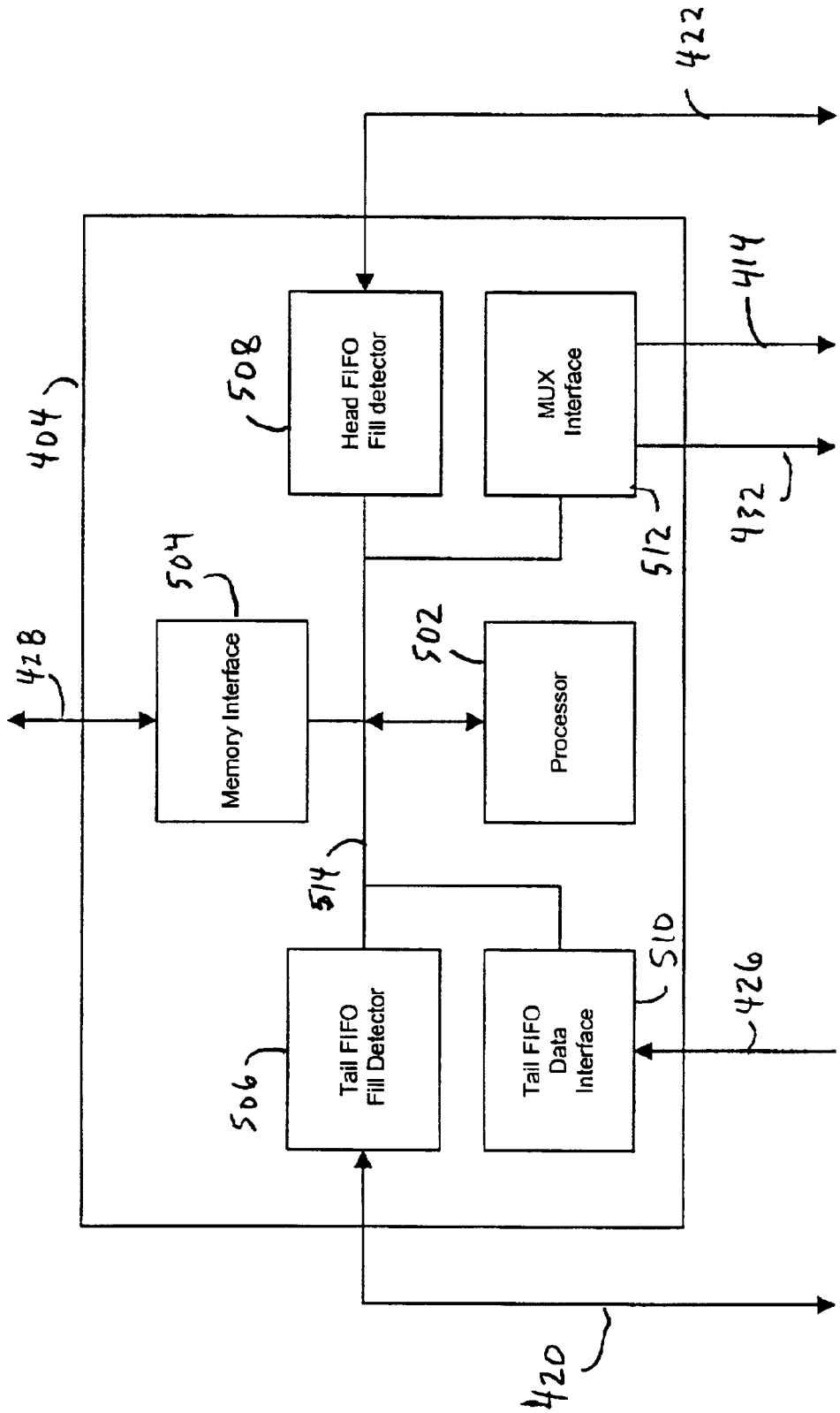
FIG. 5 shows one embodiment of a controller for use with the head and tail caching system of FIG. 4.

FIG. 5 shows one embodiment of the controller 404 for use with the head and tail caching system 400. The controller 404 includes a processor 502, a memory interface 504, a tail FIFO fill detector 506, a head FIFO fill detector 508, a tail FIFO data interface 510 and a mux interface 512.

The processor 502 may comprises a central processing unit (CPU) executing program instructions, or may comprise a gate array or stand alone hardware logic, or any combination of software and/or hardware. The processor is coupled to the other components within the controller 404 via a bus 514.

The tail FIFO fill detector 506 couples to the fill level indicator 420 and operates to determine tail FIFO fill information, and to transfer this information to the processor 502 via the bus 514. The head FIFO fill detector 508 couples to the fill level indicator 422 and operates to determine head FIFO fill information, and to transfer this information to the processor 502 via the bus 514. The tail FIFO interface 510 operates to receive data output from the tail FIFO and to output this data on the bus 514 for processing by the processor 502 or for storage in the memory 406 via the memory interface 504.

The memory interface 504 operates to read and write data to the memory 406. During write operations, the data is received at the memory interface 504 via the bus 514. During read operations, the data is read from the memory and placed on the bus 514. The processor 502 operates to control the flow of data to and from the memory interface by providing control instructions via the bus 514.

The mux interface 512 operates to receive mux control instructions from the processor 502 via the bus 514 and transfer these instructions to the mux 412 via the mux control line 414. The mux interface 512 also operates to receive data from the bus 514 and output this data, via output 432 to the second input of the mux 412. Thus, the controller 404, includes a processor 502 and various interface components to control the flow of data from the tail FIFO to the memory, and from the memory to the head FIFO.

In one embodiment included in the present invention, a system is provided for efficient memory utilization. For example, the system provides efficient memory utilization by providing the most efficient utilization of the communication bandwidth to and from the memory. Thus, it is possible for the caching system to receive and transmit data at high data rates, while using slow speed components to perform memory operations during caching.

Figure 6:
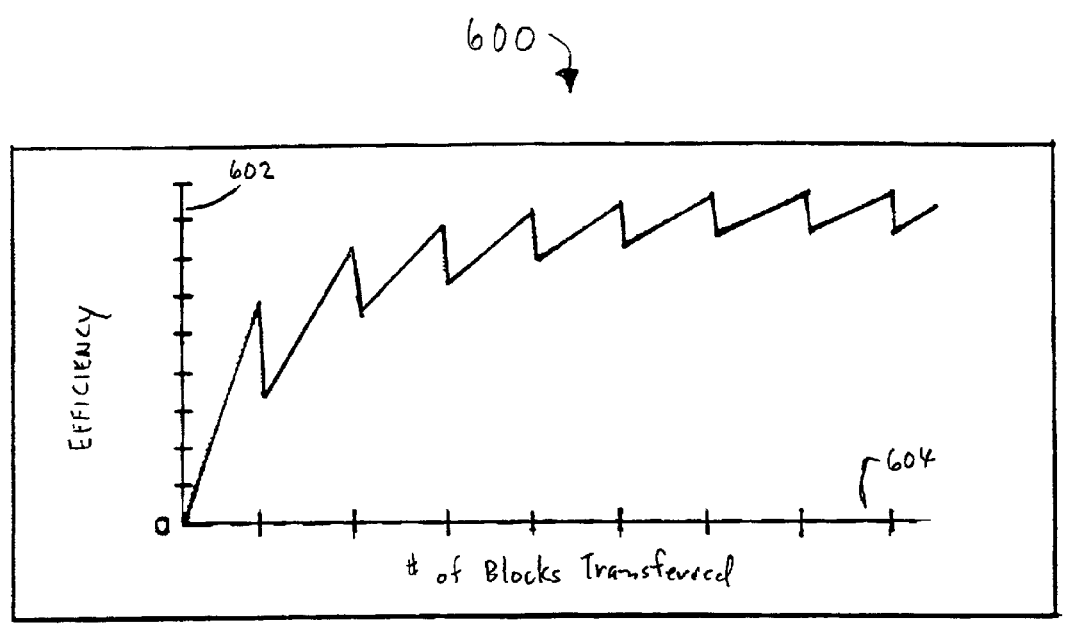
FIG. 6 shows a diagram of transfer efficiency versus data block size.

FIG. 6 shows a diagram 600 illustrating transfer efficiency versus data block size when transferring data to and from a memory, such the memory 406. For example, the efficiency can be measured across the memory interface 428, as indicated in FIG. 4 at 434.

The diagram 600 shows a transfer efficiency indicator on the vertical axis 602, and the number of blocks transferred on the horizontal axis 604. The block size describes an amount of data transferred in a memory access. For example, a single memory access may transfer 4, 8, or 16 bytes of data, or in some cases even more. Furthermore, there may be some overhead associated with each block of data transferred. Thus, the diagram 600 demonstrates that for transfers involving a small numbers of blocks, the block overhead decreases efficiency. The diagram 600 also shows that efficiency decreases when less than full blocks of data are transferred. Additionally, the diagram 600 shows that as the number of blocks transferred increases, the transfer efficiency increases and the effect on efficiency of block overhead decreases. The variation in the efficiency shown in the diagram 600 is referred to as "sawtooth" behavior. The sawtooth behavior results from transferring less than full blocks of data.

Figure 7:
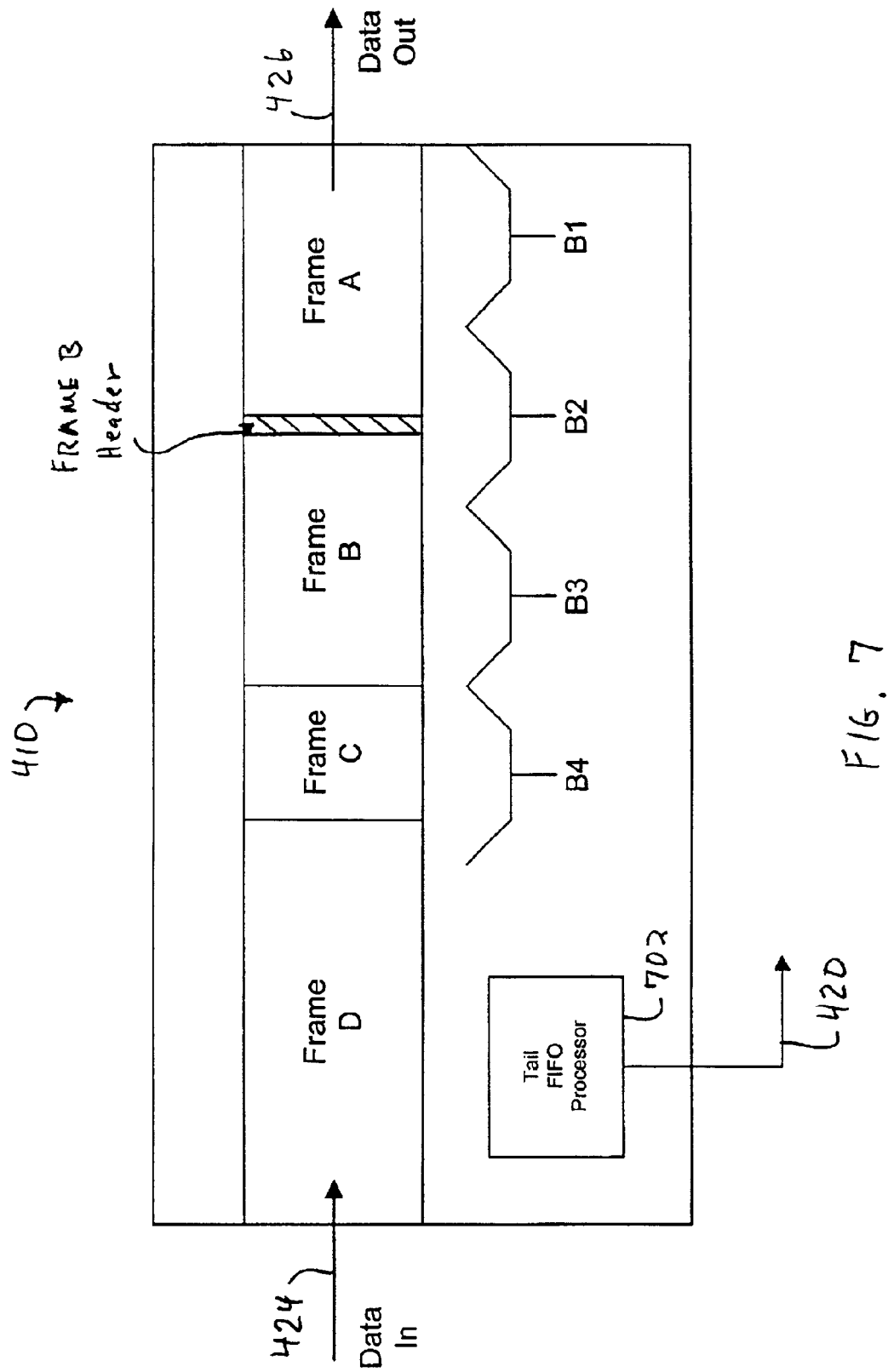
FIG. 7 shows a diagram of how input data is grouped into blocks in accordance with the present invention.

FIG. 7 shows a portion of the tail FIFO 410 illustrating how received data is grouped into blocks in accordance with the present invention. Assuming the data shown in FIG. 7 represents data frames received and stored in the tail FIFO. The data frames A, B, C, and D contain varying amounts of data and may include associated data header information. A tail FIFO processor 702 controls the flow of data into and out of the tail FIFO. Also shown is the tail FIFO fill level indicator 420.

In one embodiment, complete data frames are transferred from the tail FIFO to the memory as necessary to performing caching in accordance with the present invention. However, transferring entire frames may result in memory transfer blocks being only partially filled, which decreases transfer efficiency as described above with reference to FIG. 6. However, in another embodiment, the data frames are grouped together to form completely filled memory transfer blocks. For example, a memory transfer block may contain data from one, two or more data frames. As a result, the memory transfer blocks may contain one or more frame boundaries and complete and/or partial frames.

In another embodiment included in the present invention, the received data is grouped into blocks, as shown by block indicators B1–B4. The size of blocks B1–B4 is determined to provided selected memory efficiency. Thus, when data is removed from the tail FIFO for transfer to the memory 406, entire blocks are transferred so that the selected transfer efficiency is achieved. As shown in FIG. 7, the block indicated by B2 includes a frame boundary so that this block contains data from both Frame A and Frame B. By packing the data frames into completely filled blocks, and transferring those complete blocks to and from the memory 406, high memory efficiency is achieved.

However, filling each block may result in data from one frame being contained in more than one block. For example, block B2 in FIG. 7 includes data from Frame A, Frame B and the Frame B header information. When blocks are defined to comprise only a portion of a frame's data, then in one embodiment, the system inserts header information at the block boundary so that the frames may be correctly reassembled in the head FIFO before transmission.

As the caching system operates, the blocks stored in the memory are eventually retrieved and transferred to the head FIFO. Again, the memory transfer blocks are completely full so that the selected efficiency is achieved when the blocks are transferred to the head FIFO.

In one embodiment, the memory interface 428 has a 128-bit wide data path. This data path width can transfer sixteen bytes of data to or from the memory. The sixteen data bytes define a data word. To achieve a selected efficiency, a block is determined to comprise four data words for a total of sixty-four data bytes. In one embodiment of the invention, the transfer efficiency can be selected by varying the number of blocks transferred at one time. For example, one level of efficiency can be achieved by transferring one block to the memory at a time. Another level of efficiency is achieved by transferring multiple blocks to the memory at one time.

Figure 8:
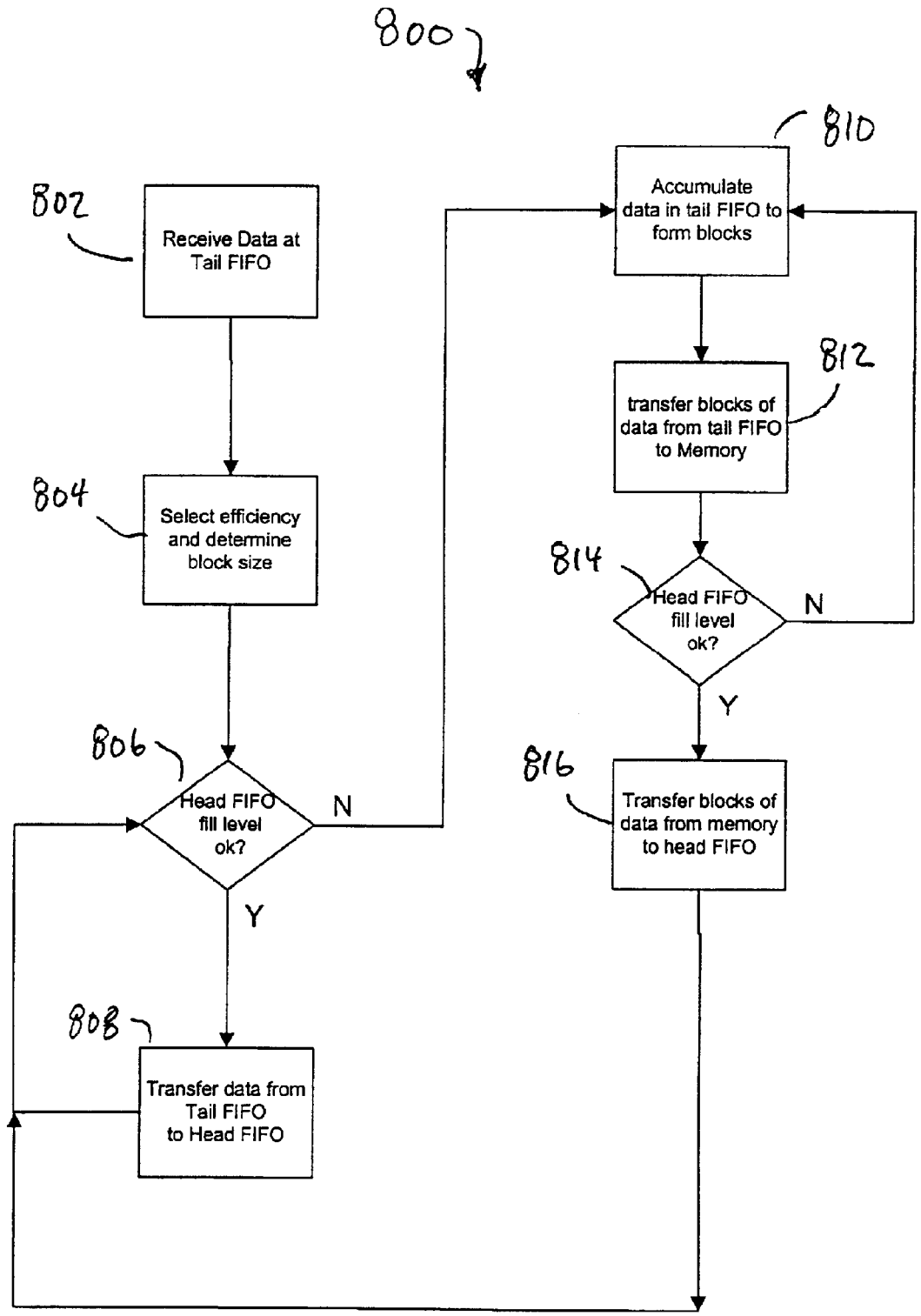
FIG. 8 shows one embodiment of a flow diagram for operating a head and tail caching system in accordance with the present invention.

FIG. 8 shows one embodiment of a flow diagram 800 for operating a head and tail caching system in accordance with the present invention. For the purposes of this description, it will be assumed that the caching system is incorporated into a network transmission path for caching data transmitted in the network.

At block 802, data is received at the tail FIFO for caching. At block 804, a memory transfer efficiency is selected and a corresponding block size is determined. For example, the selected efficiency level may result in a block size of four words, and where each memory access transfers two blocks.

At block 806, a determination is made to determine whether the fill level of the head FIFO will allow additional data to be transferred from the tail FIFO to the head FIFO. If the head FIFO has space available, then the method proceeds to block 810. If the head FIFO does not have space available, then the method proceeds to block 812. For example, the controller makes the determination from the head FIFO fill indicator 422. In one embodiment, the head FIFO will receive a transfer from the tail FIFO when there is enough free space in the head FIFO to accommodate one or more blocks of data.

At block 808, data is transferred from the tail FIFO to the head FIFO. Once reaching the head FIFO, the data will ultimately be output on the output data transmission path. During this time, input data continues to be received by the tail FIFO, and so the method proceeds to block 806.

At block 810, data is accumulated in the tail FIFO to form one or more blocks. For example, as shown in FIG. 7, data is accumulated to form blocks B1–4. Furthermore, the block definitions may cross over data frame boundaries as necessary. For example, the data is packed into the blocks so that a block may contain data from more than one data frame. The controller 404 determines how many blocks of data are currently in the tail FIFO from the tail FIFO fill indicator 420.

At block 812, the number of data blocks determined to achieve the selected efficiency level are transferred from the tail FIFO to the memory. For example, the controller 404 removes blocks of data from the tail FIFO and transfers the blocks of data into the memory 406 via the memory interface 428.

At block 814, a determination is made whether the fill level of the head FIFO will allow data blocks to be transferred from the memory to the head FIFO. If there is not enough space available in the head FIFO, the method proceeds to block 810, where blocks of data continue to form in the tail FIFO. If there is enough space in the head FIFO, the method proceeds to block 816. For example, the controller 404 makes this determination from the head FIFO fill indicator 422.

At block 816, blocks of data are transferred from the memory to the head FIFO for output on the output transmission path. The same number of blocks is transferred from the memory to the head FIFO as were transferred from the tail FIFO to the memory. This results in the selected memory efficiency being achieved.

Although described in sequential fashion, the method operates in a parallel fashion so that while data is continually received at the tail FIFO, other data stored in the memory is transferred to the head FIFO. Thus, the present invention is not limited to the method steps and sequence described with reference to FIG. 8.

Figure 9:
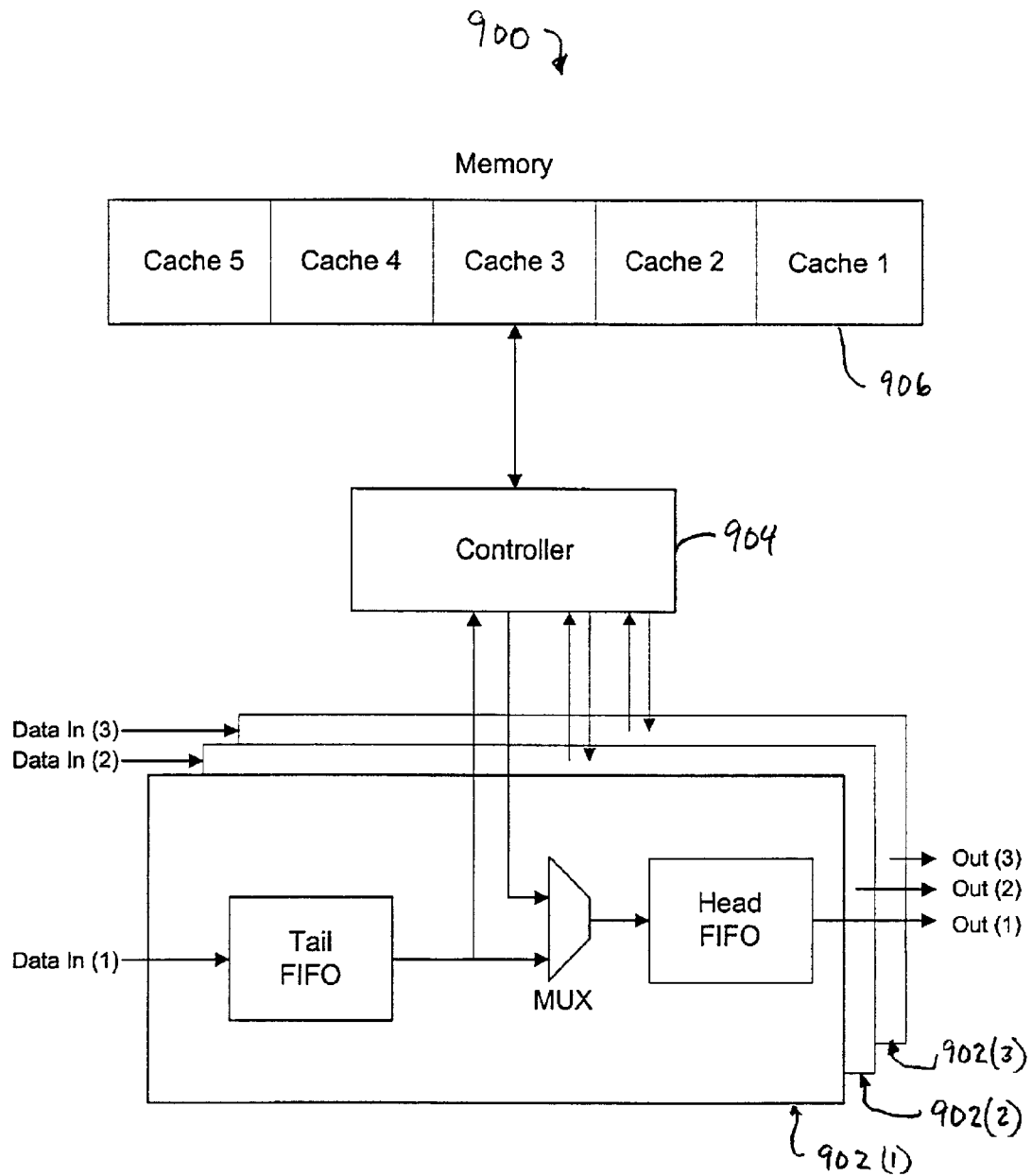
FIG. 9 shows one embodiment of a head and tail caching system for processing multiple data streams in accordance with the present invention.

FIG. 9 shows one embodiment of a head and tail caching system 900 for processing multiple data streams in accordance with the present invention. In the system 900, multiple caching circuits 902(1,2,3) are used to receive multiple input data steams, shown as Data In (1,2,3). The caching circuits are coupled to a controller 904 that is further coupled to a memory 906. The memory is divided into memory regions to be used for each cache. The controller operates to transfer blocks of data from the tail FIFOs associated with the caching circuits to associated region in the memory 906. The transfers are done so that selected memory efficiency is achieved. The tail FIFO data is blocked into completely full blocks to achieve the selected efficiency. Thus, in accordance with the present invention, a caching system for caching multiple data streams is provided.

The present invention includes a head and tail caching system for reduced sawtooth behavior. The embodiments described above are illustrative of the present invention and are not intended to limit the scope of the invention to the particular embodiments described. Accordingly, while several embodiments of the invention has been illustrated and described, it will be appreciated that various changes can be made therein without departing from the spirit or essential characteristics thereof. Accordingly, the disclosures and descriptions herein are intended to be illustrative, but not limiting, of the scope of the invention, which is set forth in the following claims.

What is claimed is:

1. A caching system, comprising:
   a tail FIFO having a tail input to receive incoming frames containing varying amounts of data and a tail output to output the incoming frames
   a memory having a memory input and a memory output, the memory input is coupled to the tail output and the memory is operable to store data from the tail output, and wherein the memory is operable to output the stored data at the memory output;
   a multiplexer having first and second multiplexer inputs coupled to the tail output and the memory output, respectively, the multiplexer having a control input to select one of the multiplexer inputs to couple to a multiplexer output;
   a head FIFO having a head input coupled to the multiplexer output to receive data from the multiplexer output, and a head output to output frames of the received data; and
   a controller coupled to the tail FIFO, the head FIFO, and the memory and operable to transfer a dynamically selected number of blocks of data from the incoming frames having a dynamically selected block size from the tail FIFO to the memory and from the memory to the head FIFO, wherein the selected block size and the selected number of blocks together provide maximum memory transfer efficiency level.

2. The system of claim 1, wherein the head FIFO further comprises a head fill indicator coupled to the controller to indicate a fill characteristic of the head FIFO.

3. The system of claim 2, wherein the controller transfers the selected number of blocks of data having the selected block size from the tail FIFO to the memory based on the head fill indicator.

4. The system of claim 2, wherein the controller transfers the selected number of blocks of data having the selected block size from the memory to the head FIFO based on the head fill indicator.

5. The system of claim 1, wherein the tail FIFO further comprises a tail fill indicator coupled to the controller to indicate a fill characteristic of the tail FIFO.

6. The system of claim 5, wherein the controller transfers the selected number of blocks of data having the selected block size from the tail FIFO to the memory based on the tail fill indicator.

7. The system of claim 1, wherein the incoming frames are of varying length and where the selected number of blocks are defined to include data from one or more of the frames, and wherein a selected block may contain data from two or more frames.

8. The system of claim 1, wherein the controller includes a control output coupled to the control input of the multiplexer, wherein the controller is operable to control which of the multiplexer inputs is coupled to the multiplexer output.

9. The system of claim 1, wherein a data path to the memory is wider than a width characteristic of the tail FIFO.

10. A method for implementing a caching system, the method comprising steps of:
   receiving frames containing varying amounts of data at a tail FIFO
   selecting a maximum efficiency level for operating a memory interface;
   dynamically determining a block size and number of blocks to support the maximum efficiency level;
   transferring the number of blocks of the data having the determined block size from the tail FIFO to a head FIFO when the head FIFO is within a first fill level, wherein the head FIFO includes an output to output the data;
   transferring the number of blocks of the data having the determined block size, from the tail FIFO to a memory via the memory interface, when the head FIFO is within a second fill level;
   transferring the number of blocks of data from the memory to the head FIFO when the head FIFO is within a third fill level.

11. The method of claim 10, wherein the frames are of varying length, and the method further comprises a step of defining the number of blocks of data having the determined block size to include data from one or more of the frames, and wherein a selected block of data may include data from two or more frames.

12. A caching system comprising:
   a tail FIFO having
      a tail input to receive incoming frames containing varying amounts of data
      a tail output to output data
   a memory having a memory input and a memory output, the memory operable to
      store data that is output from the tail output
      output data at a memory output
   a multiplexer having first and second multiplexer inputs coupled to the tail output and the memory output, respectively, the multiplexer having a control input to select one of the multiplexer inputs to couple to a multiplexer output
   a head FIFO having
      a head input coupled to the multiplexer output to receive data
      a head output to output data, the output data comprising data frames of variable length
   controller
      coupled to at least one of the tail FIFO and the head FIFO
      coupled to the memory
      operable to control transfers of dynamically selected numbers of blocks of data having dynamically selected block sizes between the memory and the at least one of the tail FIFO and the head FIFO at a maximum efficiency.

13. The caching system of claim 12 wherein
   the incoming data and the output data comprise frames of variable length
   the memory stores data in blocks of at least one fixed size.

14. The caching system of claim 12 wherein the controller is further operable to control memory transfers from the tail FIFO to the memory in fixed-length blocks, wherein the selected efficiency is achieved at least in part by maximizing an amount of data taken from the tail FIFO and put in the blocks.

15. The caching system of claim 12 wherein the controller is further operable to control transfers of data from the memory to the head FIFO in fixed-length blocks, wherein the selected efficiency is achieved at least in part by maximizing an amount of data destined for the head FIFO in the blocks.

* * * * *